Figure 1:
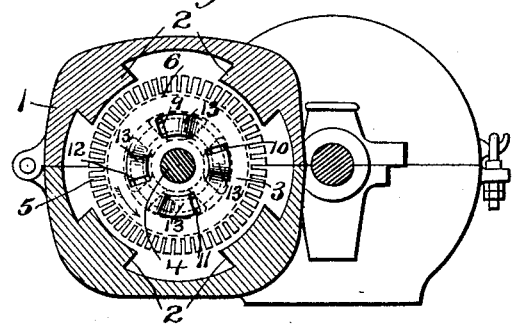

No. 700,335. Patented May 20, 1902.
J. D. KEILEY.
MEANS FOR VENTILATING CORES FOR ELECTRICAL APPARATUS.
(Application filed May 27, 1901.)
(No Model.) 2 Sheets—Sheet 1.

Attest:
T. F. Kehoe
D. V. Bourk

Inventor:
John D. Keiley
by Philipp, Sawyer, Rice & Kenndy
Attys:

No. 700,335. Patented May 20, 1902.
J. D. KEILEY.
MEANS FOR VENTILATING CORES FOR ELECTRICAL APPARATUS.
(Application filed May 27, 1901.)
(No Model.) 2 Sheets—Sheet 2.
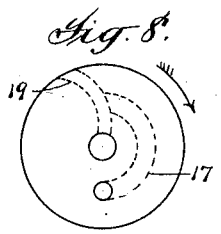
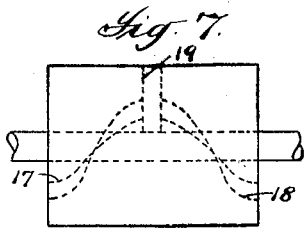
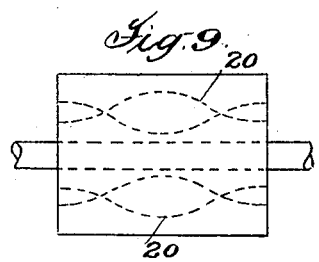
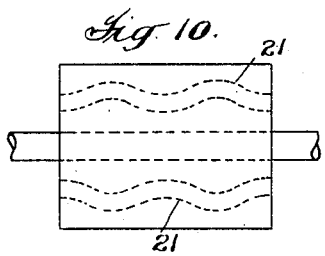

UNITED STATES PATENT OFFICE.

JOHN D. KEILEY, OF NEW YORK, N. Y.

MEANS FOR VENTILATING CORES FOR ELECTRICAL APPARATUS.

SPECIFICATION forming part of Letters Patent No. 700,335, dated May 20, 1902.

Application filed May 27, 1901. Serial No. 61,990. (No model.)

*To all whom it may concern:*

Be it known that I, JOHN D. KEILEY, a citizen of the United States, residing at New York, county of Kings, and State of New York, have invented certain new and useful Improvements in Means for Ventilating Cores for Electrical Apparatus, fully described and represented in the following specification and the accompanying drawings, forming a part of the same.

This invention relates to certain improvements in electrical apparatus, and more particularly to improvements in means for ventilating the rotating cores employed in certain kinds of such apparatus—as, for instance, motors, generators, and rotary transformers.

As is well known, heat is developed in the windings of armatures and rotating fields by the resistance offered by the windings to the current flowing therein, and this heat is transmitted to the core. Furthermore, heat is developed in the rotating core itself by the changes in its magnetic condition. The heat from these and other sources raises the temperature of the parts of the apparatus, and this in turn breaks down the insulation of the windings.

Inasmuch as the heat from the sources referred to varies with the service required of the apparatus, it follows that the capacity of a generator or motor, for instance, is limited by the amount of heat developed, because if it is attempted to unduly increase the required service the temperature of the parts is caused to rise above a given point and the insulation of the windings deteriorates and frequently breaks down altogether.

Excessive heat in the parts of the apparatus can of course be avoided by sacrifice in efficiency; but this mode of overcoming the objections to excessive heat is of course expensive and undesirable.

Attempts have been made by the use of ventilating devices to keep the temperature of the rotating core below the point where the insulation of the windings deteriorates or breaks down; but the limitations in space imposed by the working conditions of many types of apparatus render the use of ordinary ventilating devices impracticable.

In some forms of electrical apparatus now in use, and more particularly in railway-motors, it has been attempted to reduce the temperature of the apparatus by providing the core with ventilating-ducts, which are parallel to the axis of rotation of the core. Such ducts, however, have only a limited efficiency, for the reason that their radiating area is comparatively small and for the further reason that since they are parallel to the axis of rotation of the core there is no tendency for currents of air to flow through them other than that which is due to the difference of temperature between the air in the ducts and the air outside of them.

One of the objects of this invention is to produce an improved core for use in electrical apparatus, such as has been referred to, in which a ventilating duct or ducts are employed, the axis or axes of such duct or ducts being arranged in the general direction of but out of parallelism with the axis of rotation of the core, so that an increased radiating area is produced.

A further object of the invention is to produce an improved core for electrical apparatus of the type referred to, in which a ventilating duct or ducts are employed, said duct or ducts being of such a character that the rotation of the core will tend to set up a current of air in them.

With these and other objects in view the invention consists in certain improvements and in certain constructions and arrangements, which will be hereinafter fully described and then specifically pointed out in the claims hereunto appended.

Figure 2:
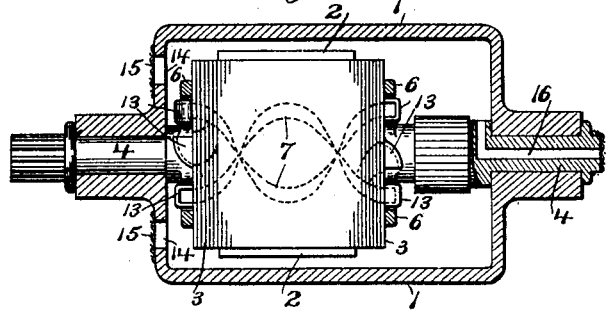
Figure 3:
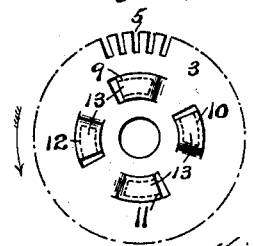
Figure 4:
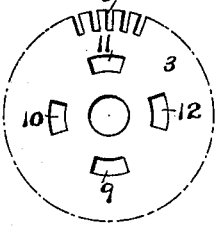
Figure 5:
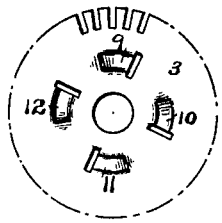
Figure 6:
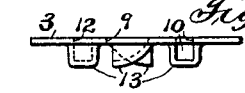

In the accompanying drawings, in which like characters of reference indicate the same parts, Figure 1 is a sectional view of a railway-motor constructed in accordance with the invention. Fig. 2 is a sectional plan view of the motor, certain parts being omitted for clearness of illustration. Fig. 3 is a front view of one of the end plates of the core. Fig. 4 is a front view of one of the center plates. Fig. 5 is a view of the other end plate. Fig. 6 is an edge view of the plate illustrated in Fig. 3. Figs. 7, 8, 9, and 10 are diagrammatic views illustrating modifications of the invention.

Referring to said drawings, the invention has been illustrated as embodied in a railway-motor, although it is applicable to other forms of electrical apparatus—such, for instance, as generators or rotary transformers.

In the drawings, 1 indicates the usual casing or shell, which serves to support pole-pieces 2, which may be bolted to or cast in one piece with the shell, as is common in such constructions. The core comprises in the construction shown a plurality of disks 3, said disks being mounted on a shaft 4 and provided with grooves 5 on their periphery to receive the windings, which have been omitted from the drawings in the interest of clearness. These disks, which may be insulated from each other in the usual manner, if desired, are clamped between spiders 6, which are held on the shaft in any suitable manner. Each of the disks 3 is provided with a plurality of perforations, and the disks are so arranged on the shaft that when they are assembled the perforations will register and form ventilating-ducts.

Constructions in which ventilating-ducts re formed by a suitable arrangement of perorated disks are well known; but in the constructions now in use the perforations in the disks are so located that when the disks are assembled the ventilating-ducts formed by the perforations are parallel to the axis of rotation of the core. When the ducts are thus arranged parallel to the axis of rotation of the core, their radiating area is limited by the length of the core, and there is, furthermore, no tendency to cause currents of air to flow through the ducts other than the difference in temperature between the air in the ducts and the outside air. In order to increase the amount of heat carried off by the radiation from the walls of these ducts, according to the present invention, the radiating-surface of the ducts is increased or the material of the core is perforated in such a direction that the rotation of the core will cause a current of air to flow through the ducts thus formed and positioned, or both means are employed.

In the preferred form of the construction, which is illustrated in Figs. 1 and 2, the ducts, which are marked 7, are helical in form, the axis of each helix coinciding with the axis of rotation of the core. By making the ducts helical in form their length, and consequently their radiating area, is increased, and this is accomplished, furthermore, without any reduction of the amount of material in the core, which is of great importance in electrical construction, because it is desirable that the amount of iron in the core be not unduly reduced. In addition to increasing the radiating area of the ducts the helical form thereof will as the core rotates cause a current of air to be set up in each of the ducts. These currents of air rushing through the ducts will carry off the radiated heat, and will therefore operate to materially reduce the temperature of the core, and thus prevent heat from being transmitted from it to the core-windings.

When the core is built up of a series of disks or plates, each of the plates will be provided with as many perforations as there are ducts. In the construction illustrated in Figs. 1 and 2 four ducts are intended to be employed, although two of the ducts are omitted in Fig. 2 in the interest of clearness. Where four ducts are employed, each of the plates is formed with four perforations 9, 10, 11, and 12, and these perforations will vary in position circumferentially in the several plates, according to the pitch of the helix. This variation in position of the perforations is indicated in Figs. 3, 4, and 5. While the helical shape of the ducts formed by these perforations might alone be relied upon to cause the currents of air to enter and flow through them, in some instances it may be desirable to further modify the shape of the ducts by so constructing their mouths as to cause them to assist in this action. To this end the mouths of the ducts may be shaped to provide blades or vanes 13, which act to force the air into the ducts. These vanes or blades may be conveniently formed by punching up the material of the end disks at the points where the perforations are formed, this construction being clearly shown in Fig. 6. It is apparent, however, that the vanes or blades might under some circumstances be separate from the end disks and be arranged to be connected thereto in any suitable manner. It will of course be understood that the blades or vanes 13 will point in opposite directions on the two end disks of the core, so that one set of blades or vanes will be forcing air into the ducts as the core revolves in one direction and the other set of blades or vanes will be delivering air from the ducts. When, therefore, the direction of rotation of the core is reversed, the action of the blades or vanes will also be reversed.

When the apparatus with which the core is employed is inclosed in a shell, as is the case in railway-motors, it is desirable, of course, to provide means for permitting the cooler outside air to enter the shell and the hot air to be delivered therefrom, and means are accordingly provided for this purpose. These means may be of any suitable description. As shown, the motor-shell is provided at one end with openings 14, these openings being covered with suitable wire-gauze 15, if desired. Openings might be provided at each end of the shell; but in some cases the construction is such that it is not convenient to do this. Under such circumstances the shaft which supports the core may be provided with a channel or passage 16, which extends through the end of the shaft and taps the space in the interior of the shell.

With the core constructed as described and with a shell provided with suitable openings or other means for carrying off the hot air it is apparent that a circulation of air can be kept up between the shell and the outside air. This will not only prevent the undue heating of the core, but will also prevent the field-windings from becoming overheated and the insulation of such windings deteriorating and breaking down.

It will of course be understood that the pitch of the helical ducts may be varied according to the character of the apparatus with which the core is intended to be used. In Fig. 2 each duct is given one complete turn around the axis of revolution of the core. This pitch has been selected for the purpose of illustration only, however, and it is to be understood that the invention is not to be confined to this or any particular pitch.

While the preferred form of the construction is that which has just been described, in which the ducts are helical in form, the axis of each helix coinciding with the axis of revolution of the core and the ducts extending completely through the core from side to side, constructions are possible and within the invention in which this is not true.

In the diagram Figs. 7 and 8, for instance, ducts 17 and 18 are employed which are helical in form, the axes of the helices coinciding with the axis of rotation of the core; but each pair of ducts 17 and 18 instead of extending through the core from side to side taps a radial passage 19, which is preferably curved in the direction of its length. In this construction the twist of the helices 17 is reverse to that of the helices 18. When, therefore, the core is rotating in the direction indicated by the arrow in Fig. 8, currents of air will be set up in the ducts 17 and 18, which will flow through them to the passage 19 and be delivered from the mouth of this passage. When, however, the direction of rotation of the core is the reverse of that indicated by the arrow in Fig. 8, the air will flow in through the passage 19 and be delivered from the ducts 17 and 18. It is apparent, of course, that the vanes or blades 13, before described, might be used with this construction; but when so used the vanes or blades on each end of the core will point in the same direction.

In the diagram Fig. 9 ducts 20 are shown, which are in the form of helices, the axes of which are parallel to the axis of rotation of the core, but not coincident therewith, and it is apparent that these ducts might be so arranged that the axes of the helices would intersect the axis of rotation of the core. The vanes or blades might also be used with this construction, if desired.

In the construction illustrated in Fig. 10 curved ducts 21 are shown which are not helices. With this construction it will be understood that there is no tendency of the air to flow through the duct other than the difference in temperature between the air in the duct and the outside air, so that the advantage gained over the old constructions is that the radiating-surface of the ducts is increased.

Under some circumstances it may be desirable to employ the vanes or blades in connection with straight ducts, the axes of which are not parallel with the axis of revolution, and it is to be understood that such a construction is within the invention.

Inasmuch as the rise in temperature above the surrounding atmosphere limits the capacity of a given apparatus—as, for instance, a motor—it is apparent that the improved means of ventilating and cooling such apparatus which has been described will materially increase the capacity of any given apparatus.

While the invention has been described in connection with a core built up from plates or disks, it is to be understood that it is equally applicable to solid cores, the ducts being formed therein in any desired manner.

While the invention is primarily intended for use with cores of rotating armatures, it may be used in connection with other rotating parts—as, for instance, fields.

While the constructions which have been illustrated and described embody certain forms of the invention, it is to be understood that the invention is not in any way limited thereto, inasmuch as other forms of constructions which embody the invention are possible.

What is claimed is—

1. A rotating core or similar rotating part for use with electrical apparatus, the material of said core being perforated to form a duct the axis of which extends in the general direction of but is not parallel with the axis of rotation of the core, substantially as described.

2. A rotating core or similar rotating part for use with electrical apparatus, the material of said core being perforated to form a plurality of ducts the axes of which extend in the general direction of but are not parallel with the axis of rotation of the core, substantially as described.

3. A rotating core or similar rotating part for use with electrical apparatus, the material of said core being perforated to form a duct which extends therethrough, the axis of said duct extending in the general direction of but not being parallel with the axis of rotation of the core, substantially as described.

4. A rotating core or similar rotating part for use with electrical apparatus, the material of said core being perforated to form a plurality of ducts which extend therethrough, the axes of said ducts extending in the general direction but not being parallel with the axis of rotation of the core, substantially as described.

5. A rotating core or similar rotating part for use with electrical apparatus, the material of said core being perforated to form a duct the axis of which extends in the general direction of but is not parallel with the axis of rotation of the core, and said duct having a mouth so shaped as to cause air to flow into it, substantially as described.

6. A rotating core or similar rotating part for use with electrical apparatus, the material of said core being perforated to form a plurality of ducts, the axes of which extend in the general direction of but are not parallel with the axis of rotation of the core, and said ducts having mouths so shaped as to cause air to flow into them, substantially as described.

7. A rotating core or similar rotating part for use with electrical apparatus, the material of said core being perforated to form a duct extending therethrough, the axis of said duct extending in the general direction of but not being parallel with the axis of rotation of the core, and said duct having a mouth so shaped as to cause air to flow into it, substantially as described.

8. A rotating core or similar rotating part for use with electrical apparatus, the material of said core being perforated to form a plurality of ducts extending therethrough, the axes of which extend in the general direction of but are not parallel with the axis of rotation of the core, and said ducts having mouths so shaped as to cause air to flow into them, substantially as described.

9. A rotating core or similar rotating part for use with electrical apparatus, the material of said core being perforated to form a duct which extends in the general direction of and is so positioned with respect to the axis of rotation of the core that a current of air is caused to flow through it when the core is rotated, substantially as described.

10. A rotating core or similar rotating part for use with electrical apparatus, the material of said core being perforated to form a duct which extends therethrough, said duct extending in the general direction of and being so positioned with respect to the axis of rotation of the core that a current of air is caused to flow through it when the core is rotated, substantially as described.

11. A rotating core or similar rotating part for use with electrical apparatus, the material of said core being perforated to form a plurality of ducts which extend in the general direction of and are so positioned with respect to the axis of rotation of the core that currents of air are caused to flow through them when the core is rotated, substantially as described.

12. A rotating core or similar rotating part for use with electrical apparatus, the material of said core being perforated to form a plurality of ducts extending therethrough, said ducts extending in the general direction of and being so positioned with respect to the axis of rotation of the core that currents of air are caused to flow through them when the core is rotated, substantially as described.

13. A rotating core or similar rotating part for use with electrical apparatus, the material of said core being perforated to form a duct which extends in the general direction of and is so positioned with respect to the axis of rotation of the core that a current of air is caused to flow through it when the core is rotated, the mouth of the duct being so shaped as to cause air to flow thereinto, substantially as described.

14. A rotating core or similar rotating part for use with electrical apparatus, the material of said core being perforated to form a duct which extends therethrough, said duct extending in the general direction of and being so positioned with respect to the axis of rotation of the core that a current of air is caused to flow through it when the core is rotated, the mouth of the duct being so shaped as to cause air to flow thereinto, substantially as described.

15. A rotating core or similar rotating part for use with electrical apparatus, the material of said core being perforated to form a plurality of ducts which extend in the general direction of and are so positioned with respect to the axis of rotation of the core that currents of air are caused to flow through them when the core is rotated, the mouths of the ducts being so shaped as to cause air to flow into the ducts, substantially as described.

16. A rotating core or similar rotating part for use with electrical apparatus, the material of said core being perforated to form a plurality of ducts extending therethrough which extend in the general direction of and are so positioned with respect to the axis of rotation of the core that currents of air are caused to flow through them when the core is rotated, the mouths of the ducts being so shaped as to cause air to flow into the ducts, substantially as described.

17. A rotating core or similar rotating part for use with electrical apparatus, the material of said core being perforated in a helical direction, whereby as the core rotates a current of air is caused to flow through the duct thus formed, substantially as described.

18. A rotating core or similar rotating part for use with electrical apparatus, the material of said core being perforated in helical directions, whereby as the core rotates currents of air are caused to flow through the ducts thus formed, substantially as described.

19. A rotating core or similar rotating part for use with electrical apparatus, the material of said core being perforated in a helical direction so as to form a duct extending therethrough, whereby as the core rotates a current of air is caused to flow through the duct thus formed, substantially as described.

20. A rotating core or similar rotating part for use with electrical apparatus the material of said core being perforated in helical directions so as to form a plurality of ducts extending therethrough, whereby as the core rotates currents of air are caused to flow through the ducts thus formed, substantially as described.

21. A rotating core or similar rotating part for use with electrical apparatus the material of said core being perforated in a helical direction, whereby as the core rotates a current of air is caused to flow through the duct thus formed, and the mouth of the duct being so shaped as to cause air to flow into the duct, substantially as described.

22. A rotating core or similar rotating part for use with electrical apparatus the material of said core being perforated in helical directions, whereby as the core rotates currents of air are caused to flow through the ducts thus formed, and the mouths of the ducts being so shaped as to cause air to flow into the ducts, substantially as described.

23. A rotating core or similar rotating part for use with electrical apparatus, the material of said core being perforated in a helical direction so as to form a duct extending therethrough, whereby as the core rotates a current of air is caused to flow through the duct thus formed, and the mouth of the duct being so shaped as to cause air to flow into the duct, substantially as described.

24. A rotating core or similar rotating part for use with electrical apparatus, the material of said core being perforated in helical directions so as to form ducts extending therethrough, whereby as the core rotates currents of air are caused to flow through the ducts thus formed, and the mouths of the ducts being so shaped as to cause air to flow into the ducts, substantially as described.

25. A rotating core or similar rotating part for use with electrical apparatus having a helical duct located therein, the axis of the helix formed by the duct being coincident with the axis of rotation of the core, substantially as described.

26. A rotating core or other similar rotating part for use in electrical apparatus having a plurality of helical ducts located therein, the axes of the helices formed by said ducts being coincident with the axis of rotation of the core, substantially as described.

27. A rotating core or other similar rotating part for use in electrical apparatus having a plurality of helical ducts extending therethrough, the axes of the helices formed by said ducts being coincident with the axis of rotation of the core, substantially as described.

28. A rotating core or similar rotating part for use with electrical apparatus having a helical duct located therein, the axis of the helix formed by said duct being coincident with the axis of rotation of the core, and the mouth of said duct being so shaped as to cause air to flow into the duct, substantially as described.

29. A rotating core or other similar rotating part for use in electrical apparatus having a plurality of helical ducts located therein, the axes of the helices formed by said ducts being coincident with the axis of rotation of the core, and the mouths of said ducts being so shaped as to cause air to flow into the ducts, substantially as described.

30. A rotating core or other similar rotating part for use in electrical apparatus having a plurality of helical ducts extending therethrough, the axes of the helices formed by said ducts being coincident with the axis of rotation of the core, and the mouths of said ducts being so shaped as to cause air to flow into the ducts, substantially as described.

31. A rotating core or other similar rotating part for use in electrical apparatus comprising a plurality of perforated disks mounted on a shaft, said disks being so arranged that the perforations form a helical duct or ducts, substantially as described.

32. A rotating core or similar rotating part for use in electrical apparatus comprising a plurality of perforated disks mounted on a shaft, said disks being so arranged that the perforations form a helical duct or ducts extending through the core, substantially as described.

33. The combination with the casing of an electrical apparatus, such as a motor, generator or rotary transformer, of a rotating core mounted therein, the material of said core being perforated to form a helical duct or a plurality of such ducts, and means for admitting air to and permitting it to escape from the casing, substantially as described.

34. The combination with the casing of an electrical apparatus, such as a motor, generator or rotary transformer, of a rotating core mounted therein, the material of said core being perforated to form a helical duct or a plurality of helical ducts extending therethrough, and means for admitting air to and permitting it to escape from the casing, substantially as described.

35. The combination with the casing of an electrical apparatus, such as a motor, generator or rotary transformer, of a rotating core mounted therein, the material of said core being perforated to form a helical duct or a plurality of such ducts, the mouths of the ducts being so shaped as to cause air to flow into the ducts, and means for admitting air to and permitting it to escape from the casing, substantially as described.

36. The combination with the casing of an electrical apparatus, such as a motor, generator or rotary transformer, of a rotating core mounted therein, the material of said core being perforated to form a helical duct or a plurality of helical ducts extending therethrough, the mouths of the ducts being so shaped as to cause air to flow into the ducts, and means for admitting air to and permitting it to escape from the casing, substantially as described.

37. The combination with the casing of an electrical apparatus, such as a motor, generator or rotary transformer, of a rotating core mounted therein, the material of said core being perforated to form a helical duct or a plurality of helical ducts extending therethrough, the axes of the helices formed by the ducts being coincident with the axis of rotation of the core, and the mouths of said ducts being shaped so as to cause air to flow into the ducts, and means for admitting air to and permitting it to escape from the casing, substantially as described.

38. A disk for use with a rotating core or similar rotating part of electrical apparatus, said disk being perforated and the material of said disk adjacent to the perforation being forced outward to form a vane to direct air into the perforation, substantially as described.

39. A rotating core or other similar rotating part for use in electrical apparatus comprising a plurality of perforated disks, the perforations of which are arranged to form a helical duct or ducts, the material of the end disks adjacent the perforations being forced outward to form vanes to direct air into the perforations, substantially as described.

In testimony whereof I have hereunto set my hand in the presence of two subscribing witnesses.

JOHN D. KEILEY.

Witnesses:
   L. VAN COTT,
   C. J. ALLIGER.